United States Patent
Chang et al.

(10) Patent No.: US 9,958,309 B2
(45) Date of Patent: May 1, 2018

(54) METHOD FOR MEASURING LEVEL OF MATERIAL LEVEL MEASURING APPARATUS

(71) Applicant: FINETEK Co., Ltd., New Taipei (TW)

(72) Inventors: Liang-Chi Chang, New Taipei (TW); Chun-Han Huang, New Taipei (TW); I-Chu Lin, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 377 days.

(21) Appl. No.: 14/883,615

(22) Filed: Oct. 14, 2015

(65) Prior Publication Data
US 2017/0108365 A1    Apr. 20, 2017

(51) Int. Cl.
*G01F 23/284* (2006.01)
*G01S 13/88* (2006.01)

(52) U.S. Cl.
CPC ............ *G01F 23/284* (2013.01); *G01S 13/88* (2013.01)

(58) Field of Classification Search
CPC ....... H01Q 1/225; G01F 23/284; G01S 13/88; G01S 13/08
USPC ......................................................... 342/124
See application file for complete search history.

(56) References Cited

U.S. PATENT DOCUMENTS

| | | | | |
|---|---|---|---|---|
| 6,559,657 B1* | 5/2003 | McCarthy | ............ | G01F 23/284 324/637 |
| 7,908,920 B2* | 3/2011 | Champion | ............ | G01F 23/284 73/304 C |
| 8,510,065 B2* | 8/2013 | Bommer | ............ | G01F 23/0084 702/55 |
| 8,931,339 B2* | 1/2015 | Muller | ................ | G01F 23/0076 73/290 R |
| 2001/0050629 A1* | 12/2001 | Benway | ................ | G01F 23/284 342/124 |
| 2008/0060431 A1* | 3/2008 | Frovik | ................... | G01F 23/284 73/290 V |
| 2013/0132005 A1* | 5/2013 | Welle | .................... | G01F 23/284 702/55 |
| 2017/0087526 A1* | 3/2017 | Luharuka | .......... | B01F 15/00207 |

* cited by examiner

Primary Examiner — Matthew M Barker
(74) Attorney, Agent, or Firm — Chun-Ming Shih

(57) ABSTRACT

A probe (14) of a material level measuring apparatus (10) inserts into a container (20). The material level measuring apparatus (10) transmits an electromagnetic wave signal. When the electromagnetic wave signal touches a surface of a material (30), a first reflected signal is generated. When the electromagnetic wave signal touches a bottom of the probe (14), a second reflected signal is generated. According to the first reflected signal and the second reflected signal, a first time-passing difference value (t1) and a second time-passing difference value (t2) are obtained. According to the first time-passing difference value (t1), the second time-passing difference value (t2) and a predetermined empty container time-passing difference value (t3), a first material level and a second material level are obtained. According to the first material level and the second material level, a third material level is obtained.

7 Claims, 3 Drawing Sheets

METHOD FOR MEASURING LEVEL OF MATERIAL LEVEL MEASURING APPARATUS

BACKGROUND OF THE INVENTION

Field of the Invention

The present invention relates to a method for measuring a level of a material, and especially relates to a method for measuring a level of a material by a material level measuring apparatus.

Description of the Related Art

Currently, the material level measuring apparatus, for example the time domain reflection radar sensor, is used widely for measuring the material level. However, a lot of factors will impact the accuracy of the material level measuring apparatus, for example the permittivity of the material. Therefore, after the material level measuring apparatus is installed, the material level measured by the material level measuring apparatus is not accurate. It is very inconvenient for the user.

SUMMARY OF THE INVENTION

In order to solve the above-mentioned problems, an object of the present invention is to provide a method for measuring a level of a material by a material level measuring apparatus.

In order to achieve the object of the present invention mentioned above, the method of the present invention comprises following steps. A probe of the material level measuring apparatus inserts into the material in a container. The material level measuring apparatus transmits an electromagnetic wave signal along a surface of the probe toward the material. When the electromagnetic wave signal touches a surface of the material, a first reflected signal is generated. The first reflected signal is transmitted back to a material level sensing circuit of the material level measuring apparatus along the probe. When the electromagnetic wave signal touches a bottom of the probe, a second reflected signal is generated. The second reflected signal is transmitted back to the material level sensing circuit along the probe. The material level sensing circuit utilizes the first reflected signal to calculate and obtain a first time-passing difference value. The material level sensing circuit utilizes the second reflected signal to calculate and obtain a second time-passing difference value. The material level sensing circuit utilizes the first time-passing difference value to calculate and obtain a first material level. The material level sensing circuit utilizes the second time-passing difference value and a predetermined empty container time-passing difference value of the material level sensing circuit to calculate and obtain a second material level. The material level sensing circuit utilizes the first material level and the second material level to calculate and obtain a third material level. After the material level sensing circuit obtains the third material level, the material level sensing circuit sends the third material level to a display unit, so that the display unit displays the third material level.

The advantage of the present invention is to measure and calculate the material level by different methods to improve the accuracy of the material level measuring apparatus. The measured data with less error is selected to be the reference for the user.

DETAILED DESCRIPTION OF THE INVENTION

Please refer to following detailed description and figures for the technical content of the present invention. The following detailed description and figures are referred for the present invention, but the present invention is not limited to it.

Figure 1:
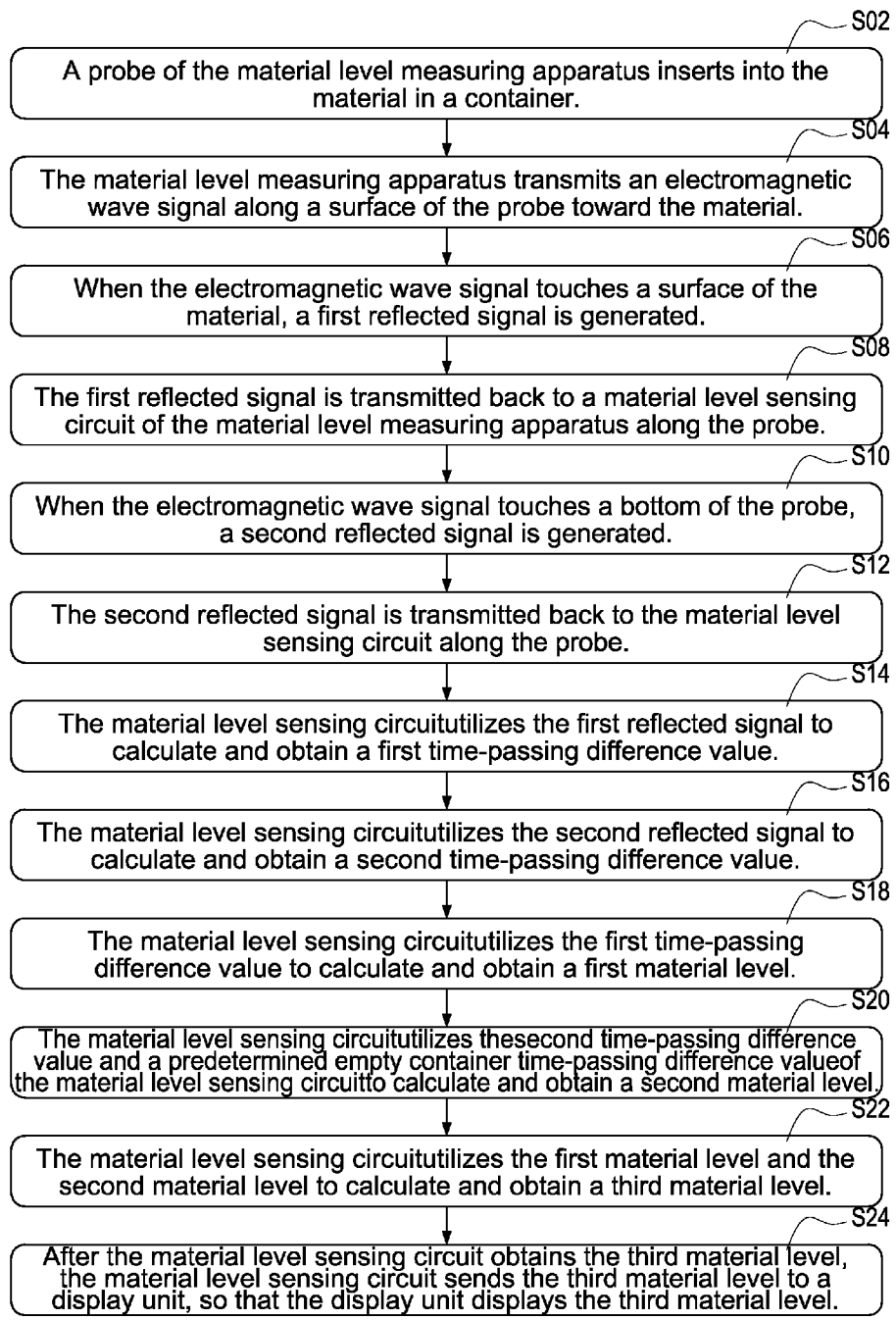
FIG. 1 shows a flow chart of a method for measuring a level of a material by a material level measuring apparatus of the present invention.
Figure 2A:
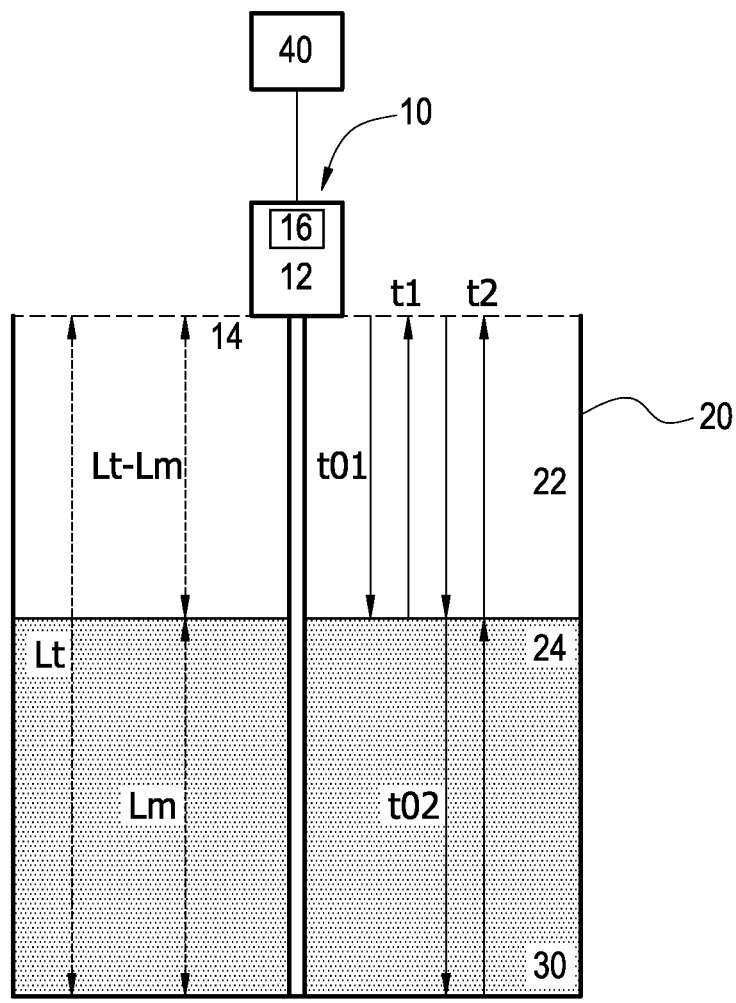
FIG. 2a shows a part diagram for the method of the present invention.
Figure 2B:
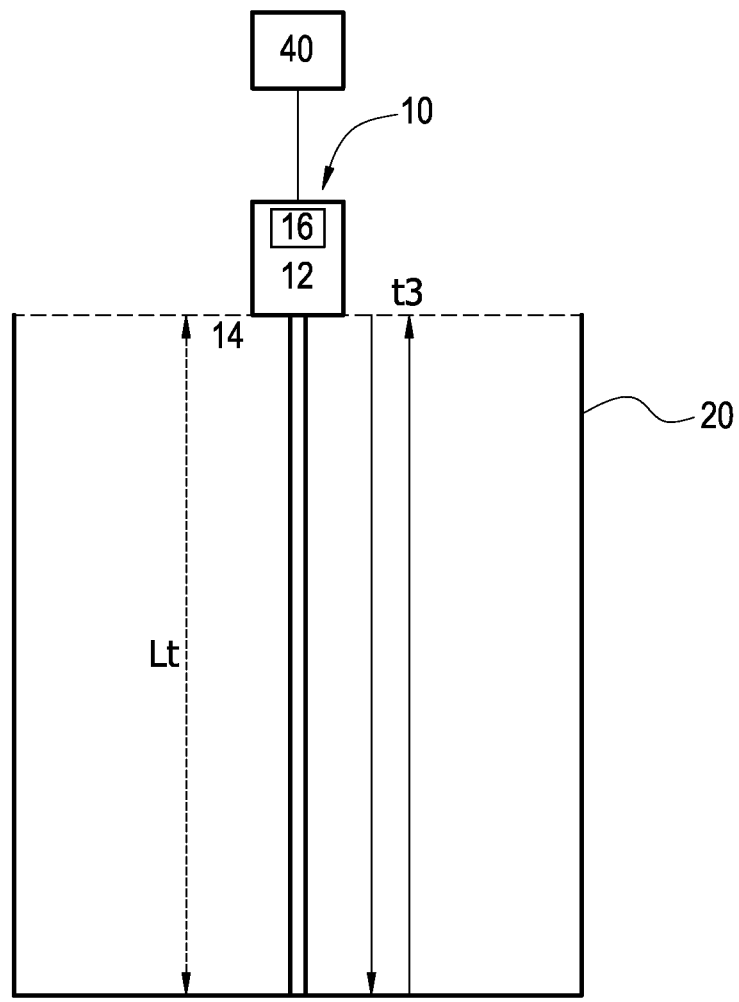
FIG. 2b shows another part diagram for the method of the present invention.

FIG. 1 shows a flow chart of a method for measuring a level of a material by a material level measuring apparatus of the present invention. FIG. 2a shows a part diagram for the method of the present invention. FIG. 2b shows another part diagram for the method of the present invention.

A method for measuring a level of a material 30 by a material level measuring apparatus 10 comprises following steps.

Step S02: A probe 14 of the material level measuring apparatus 10 inserts into the material 30 in a container 20.

Step S04: The material level measuring apparatus 10 transmits an electromagnetic wave signal (namely, a detection signal) along a surface of the probe 14 toward the material 30.

Step S06: When the electromagnetic wave signal touches a surface of the material 30, a first reflected signal is generated.

Step S08: The first reflected signal is transmitted back to a material level sensing circuit 12 of the material level measuring apparatus 10 along the probe 14.

Step S10: When the electromagnetic wave signal touches a bottom of the probe 14, a second reflected signal is generated.

Step S12: The second reflected signal is transmitted back to the material level sensing circuit 12 along the probe 14.

Step S14: The material level sensing circuit 12 utilizes the first reflected signal to calculate and obtain a first time-passing difference value t1 (would be described in details later).

Step S16: The material level sensing circuit 12 utilizes the second reflected signal to calculate and obtain a second time-passing difference value t2 (would be described in details later).

Step S18: The material level sensing circuit 12 utilizes the first time-passing difference value t1 to calculate and obtain a first material level (would be described in details later).

Step S20: The material level sensing circuit 12 utilizes the second time-passing difference value t2 and a predetermined empty container time-passing difference value t3 of the material level sensing circuit 12 to calculate and obtain a second material level (would be described in details later).

Step S22: The material level sensing circuit 12 utilizes the first material level and the second material level to calculate and obtain a third material level (would be described in details later).

Step S24: After the material level sensing circuit 12 obtains the third material level, the material level sensing circuit 12 sends the third material level to a display unit 40, so that the display unit 40 displays the third material level.

Moreover, after the electromagnetic wave signal touches the surface of the material 30, one part of the electromagnetic wave signal reflects from the surface of the material 30 to generate the first reflected signal, and the other part of the electromagnetic wave signal penetrates the surface of the material 30 to be transmitted along the surface of the probe 14 to touches the bottom of the probe 14, and then the other part of the electromagnetic wave signal reflects from the bottom of the probe 14 to generate the second reflected signal.

The step S14 mentioned above would be described in details as following. Please refer to FIG. 1 and FIG. 2a again.

The Lm indicates the material level of the material 30. The Lt indicates the probe length of the probe 14 (namely, the depth of the container 20). The Lt−Lm is equal to an air height in the container 20.

The first time-passing difference value t1 is equal to the double of a first time t01. The first time t01 is equal to the air height Lt−Lm divided by an air-wave velocity Vair. The air-wave velocity Vair is a constant c, namely the velocity of the electromagnetic wave signal when the electromagnetic wave signal is transmitted along the probe 14 and the passing medium is the air.

The content mentioned above can be shown as following equation:

$$t1=t01+t01=[(Lt-Lm)/\text{Vair}]+[(Lt-Lm)/\text{Vair}]=2*(Lt-Lm)/\text{Vair}$$

The step S16 mentioned above would be described in details as following. Please refer to FIG. 1 and FIG. 2a again.

The second time-passing difference value t2 is equal to the first time-passing difference value t1 added by the double of a second time t02. The second time t02 is equal to the material level Lm divided by a material-wave velocity Vm. The material-wave velocity Vm is equal to the constant c divided by a square root of a permittivity ε of the material 30, namely the velocity of the electromagnetic wave signal when the electromagnetic wave signal is transmitted along the probe 14 and the passing medium is the material 30.

The content mentioned above can be shown as following equation:

$$t2=t01+t01+t02+t02=[2(Lt-Lm)/\text{Vair}]+(2*Lm/Vm)$$

The step S18 mentioned above would be described in details as following. According to the first time-passing difference value t1, the first material level is calculated and obtained. According to the equations mentioned above, the first material level is equal to the probe length Lt of the probe 14 subtracted by a first air height. The first air height is equal to a distance between a transmitting side for transmitting the electromagnetic wave signal and the surface of the material 30. The first air height is equal to the first time-passing difference value t1 multiplied by the air-wave velocity Vair and then divided by two.

The content mentioned above can be shown as following equation:

$$\text{The first material level}=Lm=Lt-(t1*\text{Vair}/2)$$

The Lt, t1 and Vair are known, so that the first material level is obtained.

The step S20 mentioned above would be described in details as following. Please refer to FIG. 1 and FIG. 2a again. The second material level is calculated and obtained according to the second time-passing difference value t2 and the predetermined empty container time-passing difference value t3.

From FIG. 2a, we know that:

$$t2=[2(Lt-Lm)/\text{Vair}]+(2*Lm/Vm)$$

From FIG. 2b, we know that:

$$Lt=t3*\text{Vair}/2$$

So, $$t3=2*Lt/\text{Vair}$$

So, $$t2-t3=[2(Lt-Lm)/\text{Vair}]+(2*Lm/Vm)-(2*Lt/\text{Vair})$$

$$t2-t3=(2*Lt/\text{Vair}-2*Lm/\text{Vair})+(2*Lm/Vm)-(2*Lt/\text{Vair})$$

$$t2-t3=(-2*Lm/\text{Vair})+(2*Lm/Vm)$$

$$(t2-t3)*Vm*\text{Vair}=(-2*Lm*Vm)+(2*Lm*\text{Vair})$$

$$(t2-t3)*Vm*\text{Vair}=(\text{Vair}-Vm)*2*Lm$$

$$(t2-t3)*Vm*\text{Vair}/[2*(\text{Vair}-Vm)]=Lm$$

Here, we define that the second material level is equal to a third time-passing difference value multiplied by a wave velocity value. The third time-passing difference value is equal to a difference value between the second time-passing difference value t2 and the predetermined empty container time-passing difference value t3. The wave velocity value is equal to the air-wave velocity Vair multiplied by the material-wave velocity Vm and then divided by the double of a difference value between the air-wave velocity Vair and the material-wave velocity Vm.

Namely, the second material level=$Lm=(t2-t3)*Vm*\text{Vair}/[2*(\text{Vair}-Vm)]$ The t2, t3, Vm and Vair are known, so that the second material level is obtained.

The step S22 mentioned above would be described in details as following. The third material level is equal to an average value of the first material level and the second material level.

The content mentioned above can be shown as following equation:

The third material level=(the first material level+the second material level)/2=$\{Lt-(t1*\text{Vair}/2)+(t2-t3)*Vm*\text{Vair}/[2*(\text{Vair}-Vm)]\}2$ In another embodiment of the present invention, in the step S22, the material level sensing circuit 12 transmits a plurality of the electromagnetic wave signals for multiple measurements. A constant transmitting interval time is between these electromagnetic wave signals. The material level sensing circuit 12 utilizes these electromagnetic wave signals to obtain a plurality of the first material levels and a plurality of the second material levels. The first material level and the second material level obtained by the material level sensing circuit 12 in this time are compared with the third material level obtained in last time to obtain two comparison results. If one of the comparison results is greater than a predetermined value, the first material level or the second material level which belong to the other comparison result which is not greater than the predetermined value is selected as the third material level. Then the material level sensing circuit 12 displays the third material level on the display unit 40. If both of the comparison results are greater than the predetermined value, the first material level and the second material level obtained in this time are calculated to obtain the third material level. Then the material level sensing circuit 12 displays the third material level on the display unit 40.

Moreover, the comparison result can be values obtained from the first material level and the second material level subtracted by the third material level respectively. Or, the comparison result can be values obtained from the first material level and the second material level divided by the third material level respectively.

Moreover, the material level measuring apparatus 10 is, for example but not limited to, a time domain reflection radar sensor.

Moreover, in order to increase the usability of the material level measuring apparatus 10, the material level measuring apparatus 10 further comprises a time-expanding circuit 16 (as shown in FIG. 2a and FIG. 2b). The time-expanding circuit 16 multiplies a time-passing difference value variation (namely, t1–t2) by a gain value, so that a unit of the time-passing difference value variation is enlarged from microsecond to millisecond. Therefore, the usability of the material level measuring apparatus 10 is increased.

The advantage of the present invention is to measure and calculate the material level by different methods to improve the accuracy of the material level measuring apparatus. The measured data with less error is selected to be the reference for the user.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for measuring a level of a material (30) by a material level measuring apparatus (10), the method comprising:
    inserting a probe (14) of the material level measuring apparatus (10) into the material (30) in a container (20);
    transmitting an electromagnetic wave signal along a surface of the probe (14) toward the material (30) by the material level measuring apparatus (10);
    generating a first reflected signal when the electromagnetic wave signal touches a surface of the material (30);
    transmitting the first reflected signal back to a material level sensing circuit (12) of the material level measuring apparatus (10) along the probe (14);
    generating a second reflected signal when the electromagnetic wave signal touches a bottom of the probe (14);
    transmitting the second reflected signal back to the material level sensing circuit (12) along the probe (14);
    utilizing the first reflected signal to obtain a first time-passing difference value (t1) by the material level sensing circuit (12);
    utilizing the second reflected signal to calculate and obtain a second time-passing difference value (t2) by the material level sensing circuit (12);
    utilizing the first time-passing difference value (t1) to obtain a first material level by the material level sensing circuit (12);
    utilizing the second time-passing difference value (t2) and a predetermined empty container time-passing difference value (t3) of the material level sensing circuit (12) to obtain a second material level by the material level sensing circuit (12);
    utilizing the first material level and the second material level to obtain a third material level by the material level sensing circuit (12);
    sending the third material level to a display unit (40) by the material level sensing circuit (12) after the material level sensing circuit (12) obtains the third material level; and
    displaying the third material level by the display unit (40).

2. The method in claim 1, wherein the third material level is equal to an average value of the first material level and the second material level.

3. The method in claim 1, wherein the first material level is equal to a probe length (Lt) of the probe (14) subtracted by a first air height; the first air height is equal to the first time-passing difference value (t1) multiplied by an air-wave velocity and then divided by two.

4. The method in claim 1, wherein a third time-passing difference value is equal to a difference value between the second time-passing difference value (t2) and the predetermined empty container time-passing difference value (t3).

5. The method in claim 4, wherein the second material level is equal to the third time-passing difference value multiplied by a wave velocity value; the wave velocity value is equal to the air-wave velocity multiplied by a material-wave velocity and then divided by the double of a difference value between the air-wave velocity and the material-wave velocity.

6. The method in claim 1 further comprising transmitting a plurality of the electromagnetic wave signals for multiple measurements,
    wherein a constant transmitting interval time is between these electromagnetic wave signals; the material level sensing circuit (12) utilizes these electromagnetic wave signals to obtain a plurality of the first material levels and a plurality of the second material levels; the first material level and the second material level obtained by the material level sensing circuit (12) in this time are compared with the third material level obtained in last time to obtain two comparison results; if one of the comparison results is greater than a predetermined value, the first material level or the second material level belonging to the other comparison result not greater than the predetermined value is selected as the third material level; then the material level sensing circuit (12) displays the third material level on the display unit (40).

7. The method in claim 6, wherein if both of the comparison results are greater than the predetermined value, the first material level and the second material level obtained in this time are calculated to obtain the third material level; then the material level sensing circuit (12) displays the third material level on the display unit (40).

* * * * *